(12) United States Patent
Jang et al.

(10) Patent No.: US 10,782,463 B2
(45) Date of Patent: Sep. 22, 2020

(54) DISPLAY PANEL WITH POLARIZING PLATES AND DISPLAY APPARATUS INCLUDING THE SAME

(71) Applicant: SAMSUNG ELECTRONICS CO., LTD., Suwon-si (KR)

(72) Inventors: Nae-Won Jang, Seongnam-si (KR); Byoung-Jin Cho, Anyang-si (KR); Seung Jun Jeong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/162,943

(22) Filed: Oct. 17, 2018

(65) Prior Publication Data
US 2019/0113665 A1   Apr. 18, 2019

(30) Foreign Application Priority Data
Oct. 17, 2017   (KR) .......................... 10-2017-0134533

(51) Int. Cl.
*G02B 5/30*   (2006.01)
*G02F 1/1335*   (2006.01)
(Continued)

(52) U.S. Cl.
CPC ........... *G02B 5/305* (2013.01); *G02B 5/0268* (2013.01); *G02B 5/0284* (2013.01);
(Continued)

(58) Field of Classification Search
CPC combination set(s) only.
See application file for complete search history.

(56) References Cited

U.S. PATENT DOCUMENTS 6,628,355 B1   9/2003   Takahara
6,650,472 B1 *  11/2003   Adachi ............... G02B 3/0012
                                                  348/E9.027
(Continued)

FOREIGN PATENT DOCUMENTS

JP   2008-268861 A   11/2008
KR   10-2008-0010419 A   1/2008
KR   10-2017-0027248 A   3/2017

OTHER PUBLICATIONS

International Search Report dated Feb. 13, 2019 issued by the International Searching Authority in counterpart international Patent Application No. PCT/KR2018/011892. (PCT/ISA/210).

*Primary Examiner* — Lauren Nguyen
(74) *Attorney, Agent, or Firm* — Sughrue Mion, PLLC (57) ABSTRACT

A display panel and a display apparatus including the display panel are provided. The display apparatus includes: a display panel; and a backlight unit configured to supply light to the display panel, wherein the display panel includes: a liquid crystal layer; a first polarizing plate disposed between the backlight unit and the liquid crystal layer; and a second polarizing plate facing the first polarizing plate with the liquid crystal layer disposed therebetween, and containing a light absorbing agent for absorbing light of a specific wavelength band, wherein the first polarizing plate includes: a first polarizing layer including a plurality of refracting layers having different refractive indexes; and at least one second polarizing layer disposed on the first polarizing layer.

21 Claims, 10 Drawing Sheets

(51) Int. Cl.
*G02B 5/02* (2006.01)
*G02F 1/13357* (2006.01)

(52) U.S. Cl.
CPC .. *G02F 1/133509* (2013.01); *G02F 1/133528* (2013.01); *G02F 1/133536* (2013.01); *G02F 1/133615* (2013.01); *G02F 2001/133545* (2013.01)

(56) References Cited

U.S. PATENT DOCUMENTS

| | | |
|---|---|---|
| 2004/0017529 A1 | 1/2004 | Choi et al. |
| 2007/0228586 A1* | 10/2007 | Merrill .................. B29C 55/023 |
| | | 264/1.34 |
| 2007/0252923 A1 | 11/2007 | Hwang et al. |
| 2008/0151147 A1* | 6/2008 | Weber .................... G02B 5/305 |
| | | 349/96 |
| 2008/0297696 A1 | 12/2008 | Banerjee |
| 2010/0177397 A1* | 7/2010 | Kamiyama .............. G02B 5/02 |
| | | 359/609 |
| 2010/0231831 A1 | 9/2010 | Miyatake et al. |
| 2017/0192130 A1 | 7/2017 | Liu et al. |

\* cited by examiner

DISPLAY PANEL WITH POLARIZING PLATES AND DISPLAY APPARATUS INCLUDING THE SAME

CROSS-REFERENCE TO RELATED APPLICATION

This application is based on and claims priority under 35 U.S.C. § 119 to Korean Patent Application No. 10-2017-0134533, filed on Oct. 17, 2017, in the Korean Intellectual Property Office, the disclosure of which is incorporated by reference herein in its entirety.

BACKGROUND

1. Field

The disclosure relates to a display panel and a display apparatus including the same, and more particularly, to a display panel having an improved structure for enhancing visibility, and a display apparatus including the display panel.

2. Description of the Related Art

A display apparatus is an output apparatus for visually displaying images and data information, such as characters, figures, etc. Display apparatuses are widely used in various fields, such as home, places of business, etc.

The display apparatus display images using a backlight unit and a display panel. Examples of the display panel include a liquid crystal display (LCD) using liquid crystal, a display panel using self-emissive light emitting diodes (LEDs), a display panel using organic light emitting diodes (OLEDs), and a display panel using active-matrix organic light emitting diodes (AMOLEDs).

A display apparatus may include a polarizing plate. The polarizing plate is used to control the vibrating direction of light in order to visualize a display pattern of the display apparatus.

When the polarization ratio of the polarizing plate is low, the interval between the black level and the white level is narrowed to reduce a contrast ratio. Accordingly, a color viewing angle of the display apparatus deteriorates so that there is a case in which the screen of the display apparatus appears red.

SUMMARY

Provided is a display panel having an improved structure for increasing a polarization ratio, and a display apparatus including the display panel.

Also provided is a display panel having an improved structure for achieving a desired color viewing angle, and a display apparatus including the display panel.

Additional aspects will be set forth in part in the description which follows and, in part, will be apparent from the description, or may be learned by practice of the presented embodiments.

In accordance with an aspect of the disclosure, there is provided display apparatus including: a display panel; and a backlight unit configured to supply light to the display panel, wherein the display panel includes a liquid crystal layer, a first polarizing plate disposed between the backlight unit and the liquid crystal layer, and a second polarizing plate facing the first polarizing plate, wherein the liquid crystal layer is disposed between the first polarizing plate and the second polarizing plate, wherein the second polarizing plate includes a light absorbing agent that absorbs light of a specific wavelength band, and wherein the first polarizing plate includes a first polarizing layer including a plurality of refracting layers having different refractive indexes; and at least one second polarizing layer disposed on the first polarizing layer.

The first polarizing layer may include a first surface facing the liquid crystal layer and a second surface facing the backlight unit, and the at least one second polarizing layer may be disposed on at least one of the first surface and the second surface of the first polarizing layer.

The plurality of refracting layers may include a plurality of first refracting layers having a first refractive index and a plurality of second refracting layers having a second refractive index smaller than the first refractive index, and the plurality of first refracting layers are stacked alternatingly with the plurality of second refracting layers.

The at least one second polarizing layer may include polyethylene naphthalate.

The second polarizing plate may include a polarizing layer and a protection layer disposed on the polarizing layer, and including the light absorbing agent.

The light absorbing agent may absorb red light.

The light absorbing agent may include tetra-aza-porphyrin.

The first polarizing plate may further include an adhesive layer disposed between the first polarizing layer and the at least one second polarizing layer.

The adhesive layer may include pressure sensitive adhesive.

In accordance with an aspect of the disclosure, there is provided display apparatus including: a display panel; and a backlight unit configured to supply light to the display panel, wherein the display panel includes a liquid crystal layer, a first polarizing plate disposed below the liquid crystal layer in a first direction, and a second polarizing plate disposed above the liquid crystal layer in the first direction, and wherein the first polarizing plate includes a first polarizing layer including a plurality of refracting layers stacked in a first direction, the plurality of refracting layers having different refractive indexes, and at least one second polarizing layer disposed on the first polarizing layer, the at least one second polarizing layer including a plurality of refractive materials arranged in a second direction.

The second direction may be orthogonal to the first direction.

The first polarizing layer may further include a first surface facing the liquid crystal layer and a second surface facing the backlight unit, and the at least one second polarizing layer is disposed on at least one of the first surface and the second surface of the first polarizing layer.

The plurality of refracting layers may include a plurality of first refracting layers having a first refractive index; and a plurality of second refracting layers having a second refractive index smaller than the first refractive index, and the plurality of first refracting layers are stacked alternatingly with the plurality of second refracting layers.

The plurality of refractive materials include polyethylene naphthalate.

The second polarizing plate may include a light absorbing agent that absorbs light of a specific wavelength band.

The light absorbing agent may include tetra-aza-porphyrin.

The second polarizing plate may include a polarizing layer and a protection layer disposed on the polarizing layer, the polarizing layer may include a protection layer placement surface on which the protection layer is provided, and the light absorbing agent is provided on the protection layer placement surface.

The second polarizing plate may include a polarizing layer and a protection layer disposed on the polarizing layer, wherein the polarizing layer may include a protection layer placement surface on which the protection layer is placed, and the light absorbing agent is patterned on the protection layer placement surface.

In accordance with an aspect of the disclosure, there is provided a display panel including: a liquid crystal layer; a first polarizing plate disposed below the liquid crystal layer in a first direction, the first polarizing plate including a light absorbing agent that absorbs light of a specific wavelength band; and a second polarizing plate disposed above the liquid crystal layer in the first direction, wherein the first polarizing plate includes a first polarizing layer including a plurality of refracting layers stacked in a first direction, the plurality of refracting layers having different refractive indexes; and at least one second polarizing layer disposed on the first polarizing layer, the at least one second polarizing layer including a plurality of refractive materials arranged in a second direction.

The first polarizing layer may include a first surface and a second surface opposite to the first surface in the first direction, wherein the at least one second polarizing layer is disposed on at least one of the first surface and the second surface of the first polarizing layer.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, embodiments of the present disclosure will be described in detail with reference to the appended drawings. In the following description, the terms "front end", "rear end", "upper portion", "lower portion", "upper end", and "lower end" are defined based on the drawings, and the shapes and positions of the corresponding components are not limited by the terms.

In the following description, a first direction Z (i.e., a front-rear direction) may represent a thickness direction of a display apparatus. Also, the first direction Z may represent a direction in which a display panel is coupled with a backlight unit. Also, the first direction Z may represent a stacked direction of the display panel, more specifically, a direction in which layers constituting the display panel are stacked. The terms "top", "upward", "upper", "above", and the like may refer to a positive direction Z, while the terms "bottom", "downward", "lower", "below", and the like may refer to a negative direction Z. A second direction X may represent a longitudinal direction of the display apparatus. Also, the second direction X may represent a longitudinal direction of the display panel. A third direction Y may represent a height direction of the display apparatus. Also, the third direction Y may represent a height direction of the display panel. Preferably, the first direction Z, the second direction X, and the third direction Y may be orthogonal to one another.

As used herein, the terms "1st" or "first" and "2nd" or "second" may use corresponding components regardless of importance or order and are used to distinguish one component from another without limiting the components.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
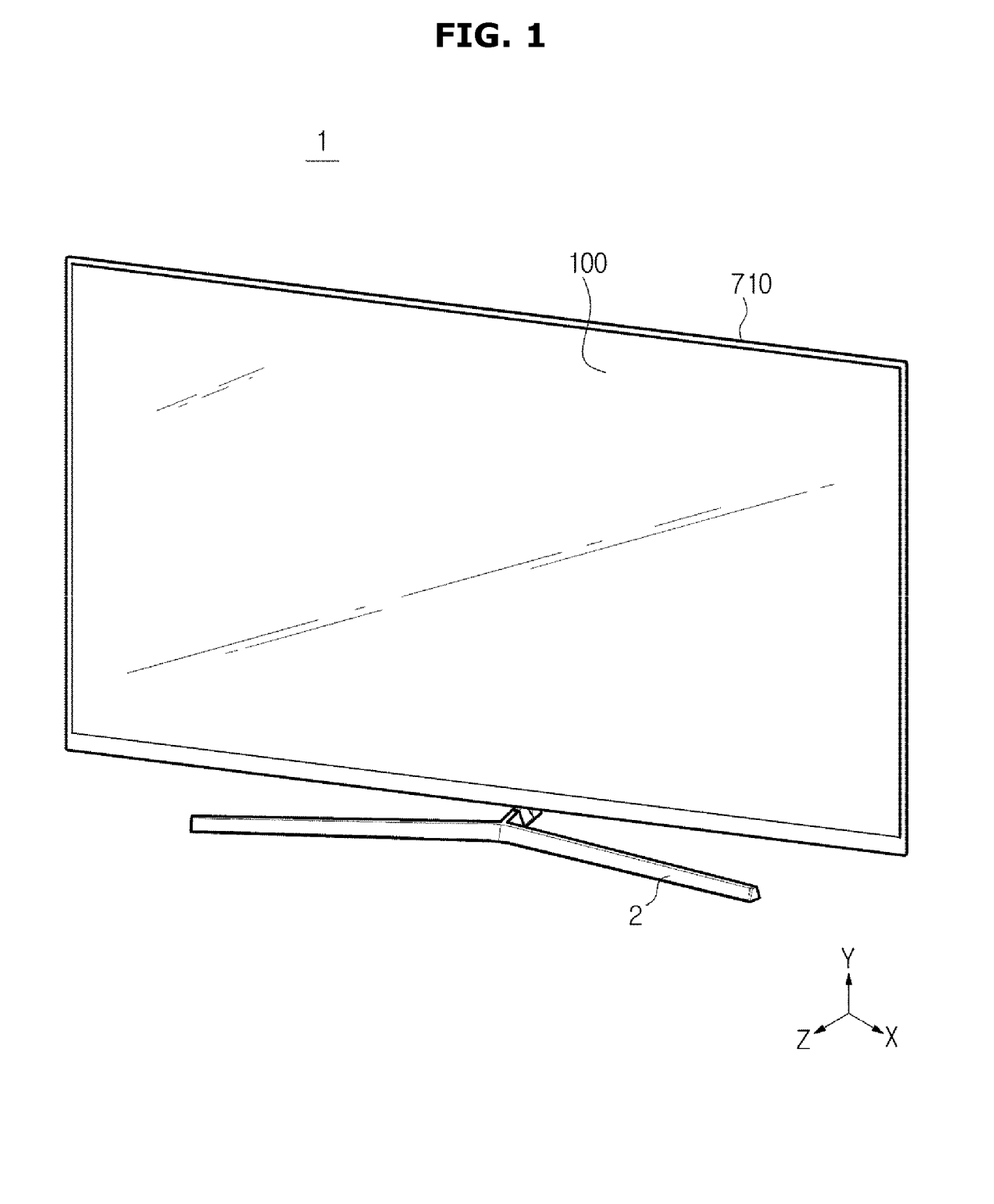
FIG. 1 is a perspective view showing the outer appearance of a display apparatus according to an embodiment.

FIG. 1 is a perspective view showing the outer appearance of a display apparatus according to an embodiment.

A display apparatus 1 is an apparatus for displaying information, data, etc. as characters, figures, graphs, and images. Examples of the display apparatus 1 include a television which is a long-distance communication medium for transmitting moving images and image signals, and a monitor which is a kind of a computer output apparatus.

The display apparatus 1 may be a flat display apparatus having a flat screen, as shown in FIG. 1, a curved display apparatus having a curved screen, or a bendable display apparatus having a screen that can be changed between a flat state and a curved state or can be adjusted to change a curvature of the curved screen.

The display apparatus 1 may include a display panel 100 for displaying images as a display of the display apparatus 1, and a backlight unit 500 for supplying light to the display panel 100.

The display apparatus 1 may further include a leg or stand 2 for supporting the display apparatus 1 on an installation surface. The display apparatus 1 may be supported on a floor, as shown in FIG. 1. Also, the display apparatus 1 may hang on a wall or may be a built-in type embedded into a wall, unlike the embodiment of FIG. 1.

Figure 2:
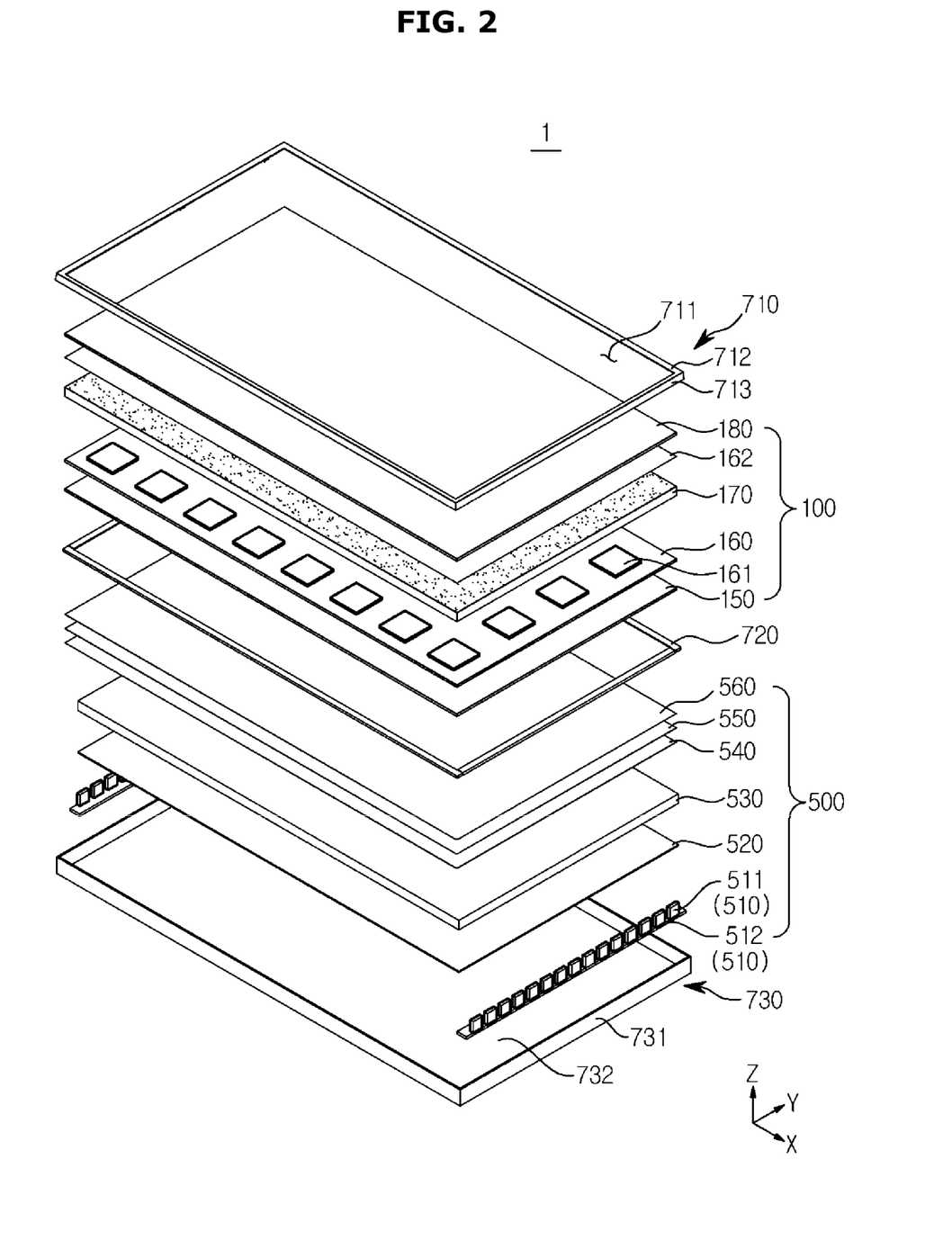
FIG. 2 is an exploded perspective view of a display apparatus according to an embodiment.

FIG. 2 is an exploded perspective view of a display apparatus according to an embodiment.

As shown in FIG. 2, the display apparatus 1 may include a chassis assembly for accommodating and supporting the display panel 100 and the backlight unit 500.

The chassis assembly may include a top chassis 710, a middle mold 720, and a bottom chassis 730.

The top chassis 710 may include an opening 711 for exposing the display panel 100 to the outside, a bezel portion 712 for supporting the upper edges of the display panel 100, and a top chassis side portion 713 extending downward from the bezel portion 712.

The bottom chassis 730 may include a bottom portion 732 disposed below the backlight unit 500, and a bottom side portion 731 extending upward from the bottom portion 732.

On the bottom chassis 730, various components of the display apparatus 1, such as the top chassis 710 and the middle mold 720, may be fixed and supported.

The bottom chassis 730 may radiate heat generated from a light source 511 to the outside. That is, heat generated from the light source 511 may be radiated through the bottom chassis 730. In order to radiate heat generated from the light source 511, the bottom chassis 730 may be made of aluminum having high heat conductivity, various kinds of metal materials such as stainless steel (SUS), or a plastic material such as acrylonitrile butadiene styrene (ABS).

However, at least one of the top chassis 710, the middle mold 720, and the bottom chassis 730 may be omitted, or the top chassis 710, the middle mold 720, and the bottom chassis may be integrated into one body.

The display apparatus 1 may further include a housing (not shown) surrounding the chassis assembly for protecting and accommodating the chassis assembly.

The display apparatus 1 may further include the backlight unit 500 for supplying light to the display panel 100.

The backlight unit 500 may be an edge type in which a light source is disposed at any one(s) of a plurality of longer sides and a plurality of shorter sides of a display panel, or a direct type in which a light source is disposed immediately below a display panel. In FIG. 2, the backlight unit 500 is an edge type backlight unit.

The backlight unit 500 may include a light source module 510 configured with the light source 511 and a light source mounting board 512 on which the light source 511 is mounted, and various optical members disposed on a traveling path of light emitted from the light source 511.

The light source 511 may supply light to the display panel 100. The light source 511 may be an LED. The LED may be provided in the form of a package in which a resin is filled around a LED chip mounted on a board. However, unlike the current embodiment, the light source 511 may be a cold cathode fluorescent lamp (CCLF) or an external electrode fluorescent lamp (EEFL).

A plurality of light sources 511 may be mounted in a line on the light source mounting board 512 along an edge of the display panel 100. On the light source mounting board 512, a circuit pattern, etc. for transferring a driving voltage and signals to the light sources 511 may be formed. The light source mounting board 512 may be rested on the bottom chassis 730.

The optical members may be disposed on the traveling path of light emitted from the light sources 511 to guide the traveling path of light or to improve the optical characteristics.

The optical members may include a light guide plate 530 for uniformly distributing light emitted from the light sources 511 toward the display panel 100. The light guide plate 530 may guide light emitted from the light sources 511 to the display panel 100.

The optical members may further include various optical sheets for improving optical characteristics. The optical sheets may be disposed on the light guide plate 530 to improve the optical characteristics of light exiting the light guide plate 530.

The optical sheets may include a diffuser sheet 540.

The optical sheets may further include a prism sheet 550. The prism sheet 550 may focus light whose brightness has been reduced sharply when passing through the diffuser sheet 540 to improve the brightness of the light.

The optical sheets may further include a protection sheet 560 for protecting the optical sheets from external impacts or foreign materials.

The optical sheets may be formed by including a single diffuser sheet 540, a single prism sheet 550, and a single protection sheet 560, by omitting one or more of the diffuser sheet 540, the prism sheet 550, and the protection sheet 560, or by further including one or more sheets in addition to the diffuser sheet 540, the prism sheet 550, and the protection sheet 560. Also, the optical sheets may be formed using a composite sheet fabricated by combining the functions of the diffuser sheet 540, the prism sheet 550, and the protection sheet 560.

The optical members may further include a reflector sheet 520 for reflecting light to prevent optical loss. The reflector sheet 520 may reflect light emitted from the light sources 511 to cause the light to enter the light guide plate 530. The reflector sheet 520 may be manufactured in various forms, such as a sheet, a film, and a plate. The reflector sheet 520 may be rested on the light source mounting board 512, and supported on the light source mounting board 512.

The display apparatus 1 may further include the display panel 100 for displaying images, as a display of the display apparatus 1.

The display panel 100 may include a liquid crystal layer 170. The liquid crystal layer 170 may display images using liquid crystal that changes the optical property according to a change in voltage and temperature. The liquid crystal layer 170 may be disposed between a first electrode 161 and a second electrode 162, and include a plurality of liquid crystal molecules. The liquid crystal molecules may be arranged in a plurality of columns in the liquid crystal layer 170. The liquid crystal molecules may be aligned in a predetermined direction or twisted in a spiral shape according to an electrical field.

The display panel 100 may further include a first polarizing plate 150 to which light passed through the optical sheets is incident. The middle mold 720 may be disposed between the optical sheets and the first polarizing plate 150. The middle mold 720 may fix the backlight unit 500 or partition the display panel 100 from the backlight unit 500.

The first polarizing plate 150 may polarize light incident from the light sources 511 to a board 160 to cause light vibrating in the same direction as a predetermined polarization axis to be incident to the board 160. One surface of the first polarizing plate 150 may contact the board 160. The first polarizing plate 150 may be a vertical polarizing plate or a horizontal polarizing plate.

The display panel 100 may further include the board 160. The board 160 may be disposed on the first polarizing plate 150. On one surface of the board 160, the first electrode 161 may be mounted. More specifically, the first electrode 161 may be mounted on one surface of the board 160 facing the liquid crystal layer 170. The board 160 may be made of a transparent material to transmit light passed through the first polarizing plate 150.

The first electrode 161 may apply current to the liquid crystal layer 170 together with the second electrode 162, which will be described later, to change the arrangement of the liquid crystal molecules in the liquid crystal layer 170. The display panel 100 may output various images according to the arrangement of the liquid crystal molecules.

The first electrode 161 may be implemented with a thin film transistor (TFT). The first electrode 161 may be connected to an external power source to receive power. A plurality of first electrodes 161 may be mounted on the board 160.

The display panel 100 may further include the second electrode 162. The second electrode 162 may face the first electrode 161 with the liquid crystal layer 170 in between. The second electrode 162 may apply current to the liquid crystal layer 170 together with the first electrode 161. On the second electrode 162, a second polarizing plate 180 may be disposed. In other words, the second electrode 162 may be disposed between the second polarizing plate 180 and the liquid crystal layer 170. The second electrode 162 may be a common electrode.

The display panel 100 may further include the second polarizing plate 180. The second polarizing plate 180 may be disposed on the second electrode 162 to polarize incident light. In other words, the second polarizing plate 180 may face the first polarizing plate 150 with the liquid crystal layer 170 in between. Light passed through the second electrode 162 may be incident to the second polarizing plate 180, and according to the vibrating direction of the light, the light may pass through the second polarizing plate 180 or be blocked by the second polarizing plate 180.

The polarization axis of the second polarizing plate 180 may be orthogonal to that of the first polarizing plate 150. Accordingly, if the first polarizing plate 150 is a vertical polarizing plate, the second polarizing plate 180 may be a horizontal polarizing plate.

When the polarization axis of the second polarizing plate 180 is orthogonal to that of the first polarizing plate 150 and the liquid crystal molecules of the liquid crystal layer 170 are aligned to transmit light passed through the first polarizing plate 150, the vibrating direction of light passed through the first polarizing plate 150 may not change so that the light may not pass through the second polarizing plate 180. Accordingly, light passed through the second electrode 162 may be not emitted to the outside. Meanwhile, when the liquid crystal molecules of the liquid crystal layer 170 are arranged in a spiral shape to transmit light passed through the first polarizing plate 150, the vibrating direction of light passed through the first polarizing plate 150 may change so that the light may pass through the second polarizing plate 180. Accordingly, light passed through the second electrode 162 may be emitted to the outside.

Figure 3:
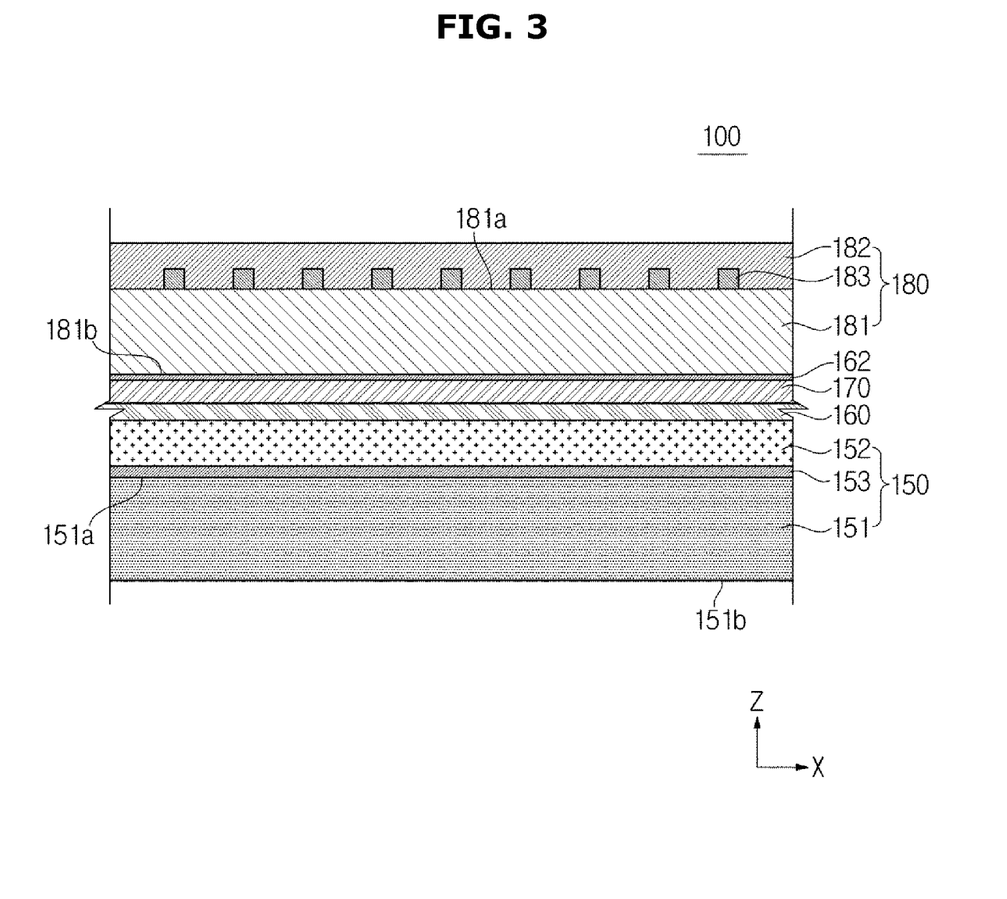
FIG. 3 is an enlarged cross-sectional view of a display panel according to an embodiment, in a display apparatus according to an embodiment.
Figure 4:
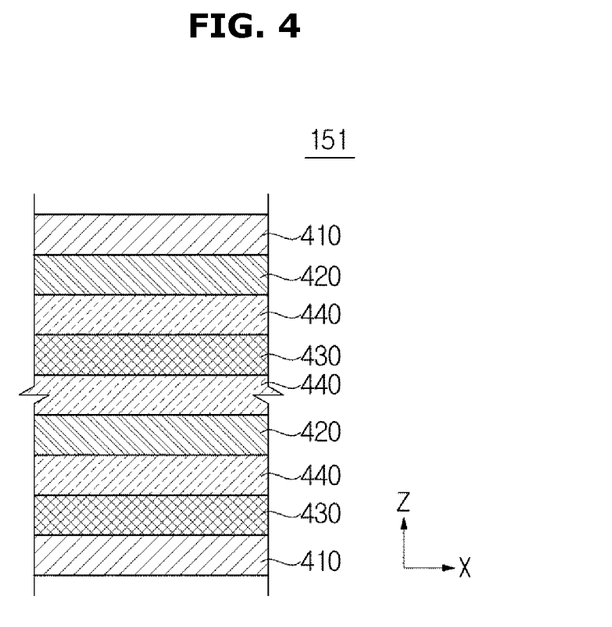
FIG. 4 is an enlarged cross-sectional view of a first polarizing layer of a first polarizing plate, in the display panel according to an embodiment.
Figure 5:
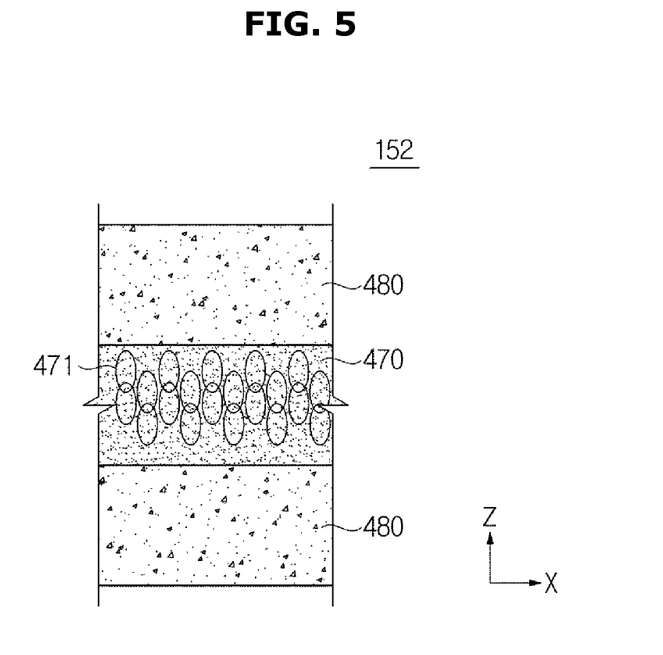
FIG. 5 is an enlarged cross-sectional view of a second polarizing layer of the first polarizing plate, in the display panel according to an embodiment.

FIG. 3 is an enlarged cross-sectional view of a display panel according to an embodiment, in a display apparatus according to an embodiment, FIG. 4 is an enlarged cross-sectional view of a first polarizing layer of a first polarizing plate, in the display panel according to an embodiment shown in FIG. 3, and FIG. 5 is an enlarged cross-sectional view of a second polarizing layer of a first polarizing plate, in the display panel according to an embodiment shown in FIG. 3. In FIG. 3, the first electrode 161 is omitted.

As shown in FIGS. 2, 3, 4, and 5, the first polarizing plate 150 may be disposed between the backlight unit 500 and the liquid crystal layer 170. In other words, the first polarizing plate 150 may be disposed between the optical sheets and the liquid crystal layer 170.

The first polarizing plate 150 may be disposed below the liquid crystal layer 170 in a first direction Z.

The first polarizing plate 150 may include a first polarizing layer 151. The first polarizing layer 151 may include a first surface 151a facing the liquid crystal layer 170 and a second surface 151b facing the backlight unit 500.

The first polarizing layer 151 may include a plurality of refracting layers having different refractive indexes. The plurality of refracting layers may be stacked in the first direction Z. The plurality of refracting layers may include a first refracting layer 420, and a second refracting layer 430 having a smaller refractive index than the first refracting layer 420. The plurality of refracting layers may include at least one first refracting layer 420 and at least one second refracting layer 430. The number of the first refracting layer 420 may be equal to that of the second refracting layer 430. The first refracting layer 420 and the second refracting layer 430 may be stacked alternately.

The first polarizing layer 151 may further include a coupling layer 440 for coupling the first refracting layer 420 with the second refracting layer 430. The coupling layer 440 may be disposed between the first refracting layer 420 and the second refracting layer 430. The first polarizing layer 151 may include at least one coupling layer 440.

The first polarizing layer 151 may further include a cover layer 410. The cover layer 410 may form a surface of the first polarizing layer 151. The cover layer 410 may be disposed on the plurality of refracting layers. The cover layer 410 may include a first cover layer 410 forming the first surface 151a of the first polarizing layer 151, and a second cover layer 410 forming the second surface 151b of the first polarizing layer 151. For example, the cover layer 410 may be made of polycarbonate (PC).

The first polarizing plate 150 may further include at least one second polarizing layer 152 disposed on the first polarizing layer 151. More specifically, the second polarizing layer 152 may be adhered on the first surface 151a of the first polarizing layer 151 by an adhesive layer 153. That is, the second polarizing layer 152 may be disposed on the first polarizing layer 151 in the first direction Z.

The second polarizing layer 152 may include a core layer 470, and a surface layer 480 disposed on the core layer 470 to form surfaces.

The second polarizing layer 152 may include a plurality of refractive materials 471 arranged in a second direction X. The plurality of refractive materials 471 may include polyethylene naphthalate (PEN). More specifically, the core layer 470 of the second polarizing layer 152 may include polyethylene naphthalate (PEN). The second direction X may be orthogonal to the first direction Z.

The first polarizing plate 150 may further include the adhesive layer 153 disposed between the first polarizing layer 151 and the at least one second polarizing layer 152. The adhesive layer 153 may include pressure sensitive adhesive (PSA).

The second polarizing plate 180 may be disposed above the liquid crystal layer 170 in the first direction Z. The second electrode 162 may be disposed between the second polarizing plate 180 and the liquid crystal layer 170.

The second polarizing plate 180 may include a light absorbing agent 183 for absorbing light of a specific wavelength band. The light absorbing agent 183 may absorb reddish light of a long wavelength. The light absorbing agent 183 may include tetra-aza-porphyrin (TAP).

The second polarizing plate 180 may include a polarizing layer 181 and a protection layer 182 disposed on the polarizing layer 181. The polarizing layer 181 of the second polarizing plate 180 may include a protection layer placement surface 181a on which the protection layer 182 is disposed, and a protection layer opposite surface 181b that is opposite to the protection layer placement surface 181a.

The light absorbing agent 183 may be disposed in the inside of the second polarizing plate 180.

For example, the light absorbing agent 183 may be disposed in the inside of at least one of the polarizing plate 181 and the protection layer 182. Preferably, the light absorbing agent 183 may be disposed in the inside of the protection layer 182. In other words, the protection layer 182 may contain the light absorbing agent 183.

According to another example, the light absorbing agent 183 may be applied on the protection layer placement surface 181a of the polarizing layer 181.

According to still another example, the light absorbing agent 183 may be patterned on the protection layer placement surface 181a of the polarizing layer 181. The light absorbing agent 183 may be formed as an embossed pattern or an engraved pattern on the protection layer placement surface 181a of the polarizing layer 181.

Figure 6:
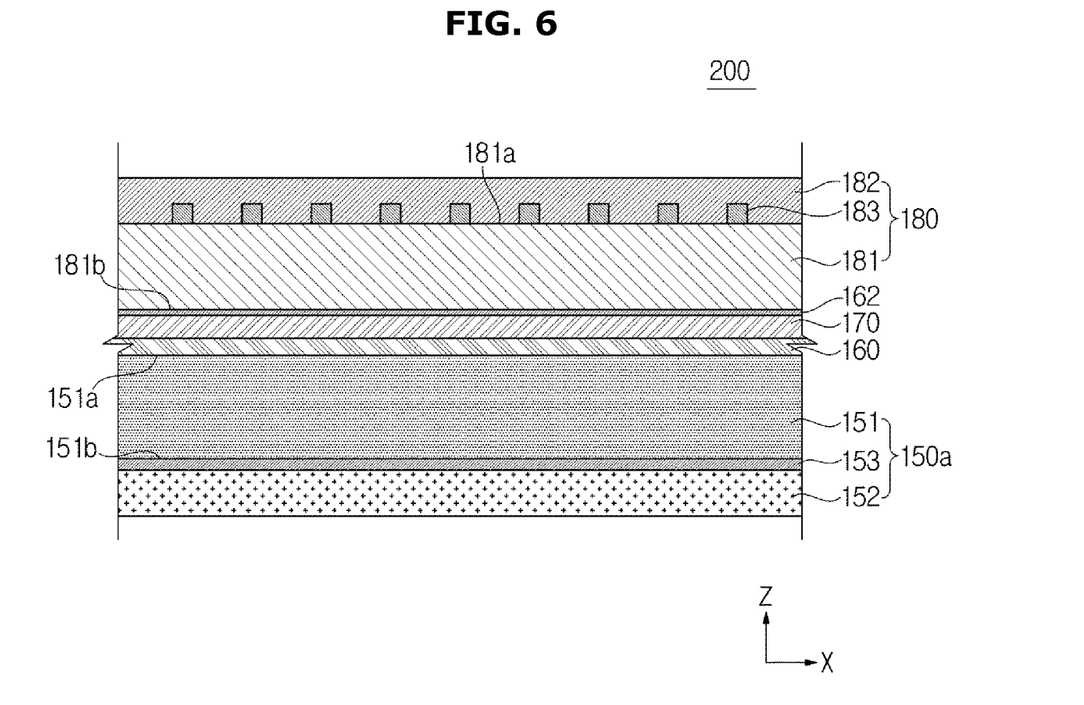
FIG. 6 is an enlarged cross-sectional view of a display panel according to an embodiment, in a display apparatus according to an embodiment.

FIG. 6 is an enlarged cross-sectional view of a display panel according to an embodiment, in a display apparatus according to an embodiment. Hereinafter, descriptions overlapping with those about the display panel 100 according to the first embodiment will be omitted. In FIG. 6, a reference numeral "200" indicates the display panel according to a second embodiment, and the first electrode 161 is omitted.

As shown in FIG. 6, the first polarizing plate 150a may include the first polarizing layer 151 and the at least one second polarizing layer 152 disposed on the first polarizing layer 151. Preferably, the second polarizing layer 152 may be adhered on the second surface 151b of the first polarizing layer 151 by the adhesive layer 153 of the second polarizing layer 152. That is, the second polarizing layer 152 may be disposed below the first polarizing layer 151 in the first direction Z.

The second polarizing layer 152 may include the core layer 470 and the surface layer 480 formed on the core layer 470 to form surfaces.

The second polarizing layer 152 may include the plurality of refractive materials 471 arranged in the second direction X. The plurality of refractive materials 471 (see FIG. 5) of the second polarizing layer 152 may reflect or diffract light absorbed in the second polarizing layer 152 among light incident to the second polarizing layer 152 to convert the light to light penetrating the second polarizing layer 152. The light penetrating the second polarizing layer 152 may be transmitted in the first direction Z to be incident to the first polarizing layer 151 located above the second polarizing layer 152. The plurality of refractive materials 471 of the second polarizing layer 152 may improve the transmission efficiency of the first polarizing plate 150a through the mechanism.

The plurality of refractive materials 471 may include polyethylene naphthalate (PEN). More specifically, the core layer 470 of the second polarizing layer 152 may include polyethylene naphthalate (PEN).

Descriptions about the second polarizing plate 180 will be omitted.

Figure 7:
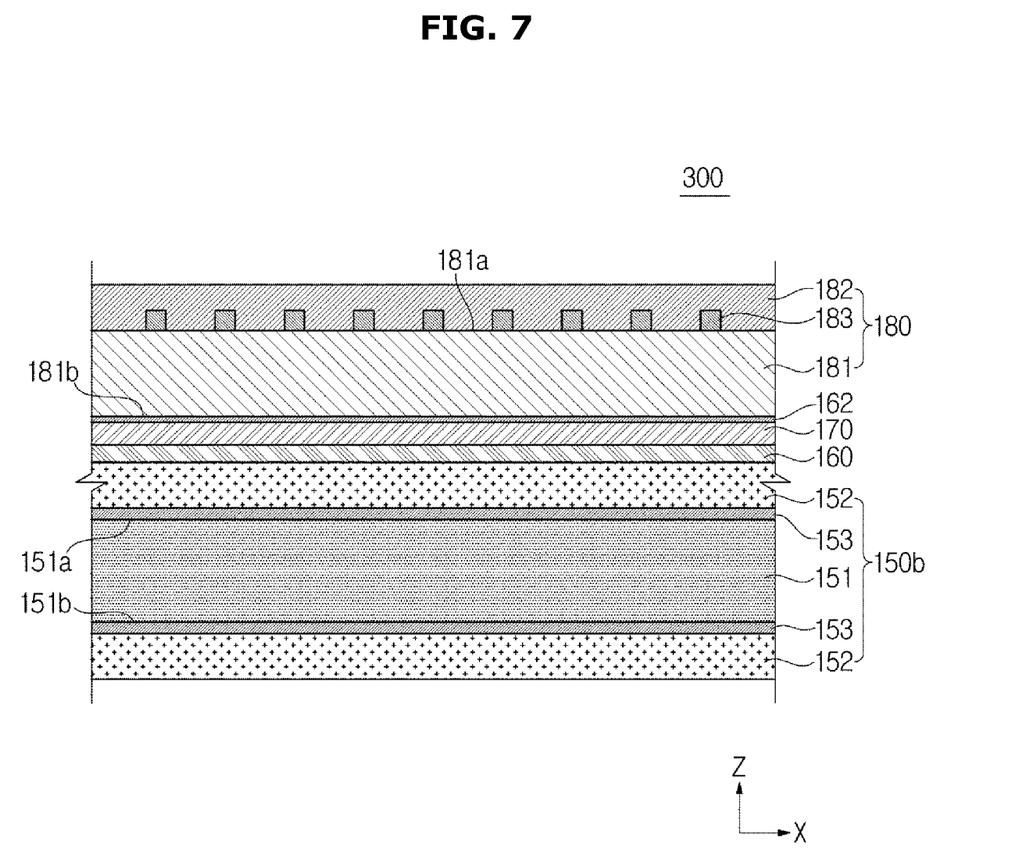
FIG. 7 is an enlarged cross-sectional view of a display panel according to an embodiment, in a display apparatus according to an embodiment.

FIG. 7 is an enlarged cross-sectional view of a display panel according to an embodiment, in a display apparatus according to an embodiment. Hereinafter, descriptions overlapping with those about the display panel 100 according to the first embodiment will be omitted. In FIG. 7, a reference numeral "300" indicates the display panel according to a third embodiment, and the first electrode 161 is omitted.

As shown in FIG. 7, the first polarizing plate 150b may include the first polarizing layer 151 and the at least one second polarizing layer 152 disposed on the first polarizing layer 151. The at least one second polarizing layer 152 may include an upper second polarizing layer 152 disposed above the first polarizing layer 151 in the first direction Z, and a lower second polarizing layer 152 disposed below the first polarizing layer 151 in the first direction Z. That is, the upper second polarizing layer 152 may be adhered on the first surface 151a of the first polarizing layer 151 by the adhesive layer 153, and the lower second polarizing layer 152 may be adhered on the second surface 151b of the first polarizing layer 151 by the adhesive layer 153.

The plurality of second polarizing layers 152 may include the core layer 470 and the surface layer 480 formed on the core layer 470 to form surfaces.

The plurality of second polarizing layers 152 may include the plurality of refractive materials 471 (see FIG. 5) arranged in the second direction X. The plurality of refractive materials 471 of the lower second polarizing layer 152 may reflect or diffract light absorbed in the lower second polarizing layer 152 among light incident to the lower second polarizing layer 152 to convert the light to light penetrating the lower second polarizing layer 152. The light penetrating the lower second polarizing layer 152 may be transmitted in the first direction Z to be incident to the first polarizing layer 151 located above the lower second polarizing layer 152. The plurality of refractive materials 471 of the lower second polarizing layer 152 may improve the transmission efficiency of the first polarizing plate 150b through the mechanism.

Descriptions about the second polarizing plate 180 will be omitted.

Figure 8:
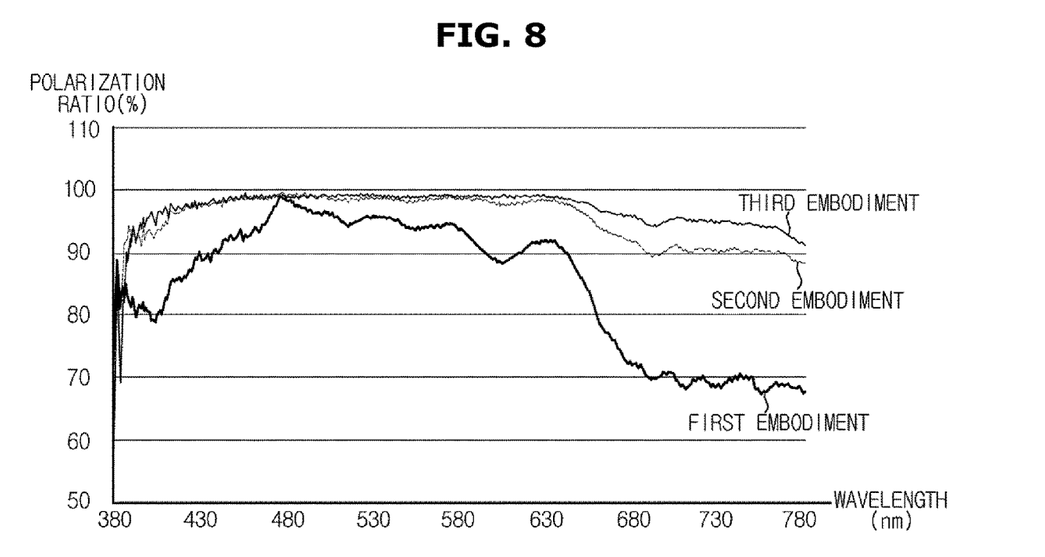
FIG. 8 is a graph showing differences in polarization ratio between a first polarizing plate configured with a first polarizing layer, a first polarizing plate configured with a first polarizing layer and a second polarizing layer disposed on one surface of the first polarizing layer, and a first polarizing plate configured with a first polarizing layer and a plurality of second polarizing layers disposed on both surfaces of the first polarizing layer.

FIG. 8 is a graph showing differences in polarization ratio between a first polarizing plate configured with a first polarizing layer, a first polarizing plate configured with a first polarizing layer and a second polarizing layer disposed on one surface of the first polarizing layer, and a first polarizing plate configured with a first polarizing layer and a plurality of second polarizing layers disposed on both surfaces of the first polarizing layer. Hereinafter, the first polarizing plate configured with the first polarizing layer will be referred to as a first embodiment, and the first polarizing plate configured with the first polarizing layer and the second polarizing layer disposed on one surface of the first polarizing layer will be referred to as a second embodiment. Also, the first polarizing plate configured with the first polarizing layer and the plurality of second polarizing layers disposed on both surfaces of the first polarizing layer will be referred to as a third embodiment. In the second embodiment, the second polarizing layer may be disposed below the first polarizing layer in the first direction Z.

In the graph of FIG. 8, the X axis represents wavelength (nm), and the Y axis represents polarization ratio (%).

The first polarizing plate according to the first embodiment has a lower polarization ratio with respect to wavelength, than the first polarizing plate according to the second embodiment and the first polarizing plate according to the third embodiment.

The first polarizing plate according to the second embodiment including a single second polarizing layer has a lower polarization ratio than the first polarizing plate according to the third embodiment including a plurality of second polarizing layers.

If a polarization ratio is high, the interval between the black level and the white level may increase to increase a contrast ratio. Meanwhile, if a polarization ratio is low, the interval between the black level and the white level may decrease to decrease a contract ratio.

It is seen from the graph of FIG. 5 that when the first polarizing plate configured with the first polarizing layer and the at least one second polarizing layer is used, a relatively higher polarization ratio and a more uniform polarization ratio are obtained, than when the first polarizing plate configured with the first polarizing layer is used.

In the case of the first polarizing plate according to the first embodiment, the screen of the display apparatus 1 may appear red since long-wavelength light has a low polarization ratio.

Figure 9:
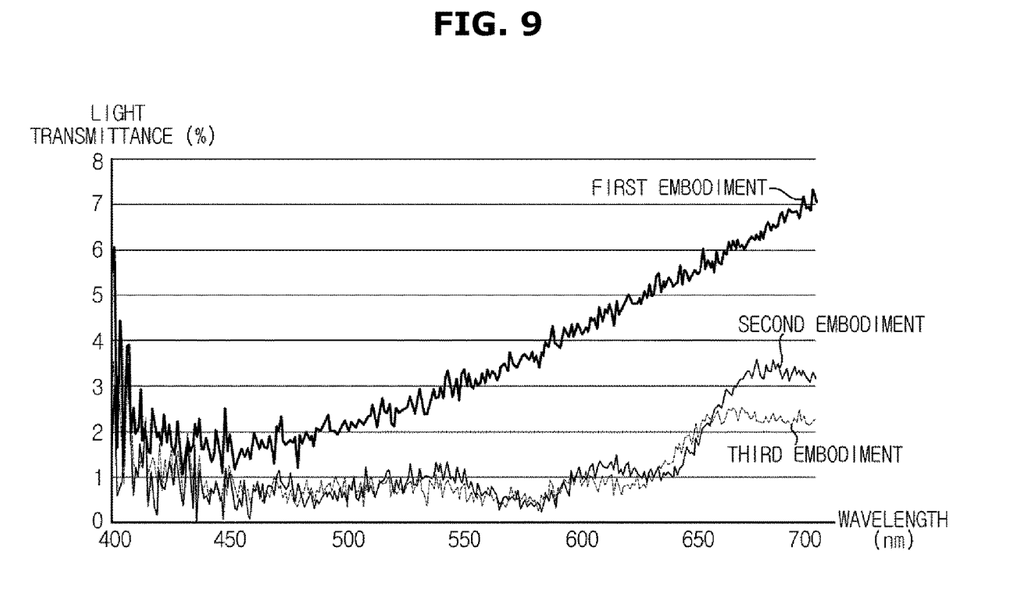
FIG. 9 is a graph showing differences in light transmittance according to wavelength between a display apparatus including a second polarizing plate and a first polarizing plate configured with a first polarizing layer, a display apparatus including a second polarizing plate containing a light absorbing agent and a first polarizing plate configured with a first polarizing layer and a second polarizing layer disposed on one surface of the first polarizing layer, and a display apparatus including a second polarizing plate containing a light absorbing agent and a first polarizing plate configured with a first polarizing layer and a plurality of second polarizing layers disposed on both surfaces of the first polarizing layer.

FIG. 9 is a graph showing differences in light transmittance according to wavelength between a display apparatus including a second polarizing plate and a first polarizing plate configured with a first polarizing layer, a display apparatus including a second polarizing plate containing a light absorbing agent and a first polarizing plate configured with a first polarizing layer and a second polarizing layer disposed on one surface of the first polarizing layer, and a display apparatus including a second polarizing plate containing a light absorbing agent and a first polarizing plate configured with a first polarizing layer and a plurality of second polarizing layers disposed on both surfaces of the first polarizing layer. Hereinafter, the display apparatus including the second polarizing plate and the first polarizing plate configured with the first polarizing layer will be referred to as a first embodiment, the display apparatus including the second polarizing plate containing the light absorbing agent and the first polarizing plate configured with the first polarizing layer and the second polarizing layer disposed on one surface of the first polarizing layer will be referred to as a second embodiment, and the display apparatus including the second polarizing plate containing the light absorbing agent and the first polarizing plate configured with the first polarizing layer and the plurality of second polarizing layers disposed on both surfaces of the first polarizing layer will be referred to as a third embodiment. In the second embodiment, the second polarizing layer may be disposed below the first polarizing layer in the first direction Z.

In the graph of FIG. 9, the X axis represents wavelength (nm), and the Y axis represents light transmittance (%).

The display apparatus according to the first embodiment has higher transmittance according to wavelength than the display apparatus according to the second embodiment and the display apparatus according to the third embodiment.

It is seen from the graph of FIG. 9 that a display apparatus including a second polarizing plate containing no light absorbing agent and a first polarizing plate configured with a first polarizing layer has higher light transmittance according to wavelength than a display apparatus including a second polarizing plate containing a light absorbing agent and a first polarizing plate configured with a first polarizing layer and at least one second polarizing layer.

The light absorbing agent may function to adjust the balance of colors displayed on the screen of the display apparatus. For example, the light absorbing agent may function to adjust the balance of a red color, a green color, and a blue color.

In the display apparatus according to the second embodiment and the display apparatus according to the third embodiment, the light absorbing agent may absorb a large amount of long-wavelength light, thereby preventing the screen of the display apparatus from appearing red, while implementing a balanced viewing angle. Meanwhile, in the display apparatus according to the first embodiment, since long-wavelength light has high transmittance, the screen of the display apparatus may appear red.

Figure 10:
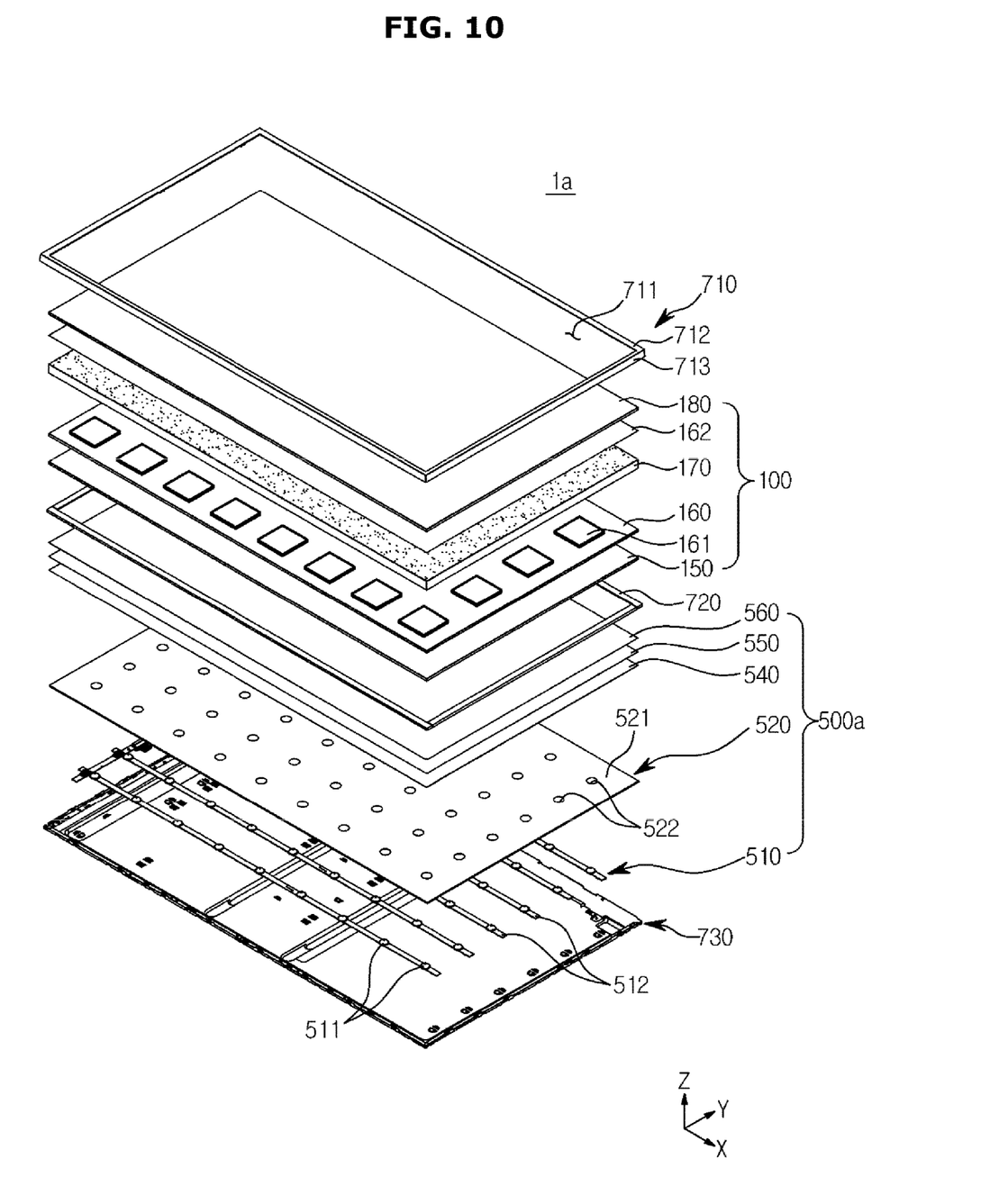
FIG. 10 is an exploded perspective view of a display apparatus according to an embodiment.

FIG. 10 is an exploded perspective view of a display apparatus according to another embodiment of the present disclosure. Hereinafter, descriptions overlapping with those provided above with reference to FIGS. 1 to 9 will be omitted. The display apparatus shown in FIG. 10 is a display apparatus including a direct type backlight unit.

As shown in FIG. 10, a display apparatus 1a may include a chassis assembly for accommodating and supporting the display panel 100 and a backlight unit 500a. The chassis assembly has been described above with reference to FIG. 2, and therefore, further descriptions thereof will be omitted.

The display apparatus 1a may include the backlight unit 500a for supplying light to the display panel 100.

The backlight unit 500a may include the light source module 510 configured with the light source 511 and the light source mounting board 512 on which the light source 511 is mounted, and various optical members disposed on a traveling path of light emitted from the light source 511.

The light source 511 may supply light to the display panel 100. The light source 511 has been described above with reference to FIG. 2, and therefore, further descriptions thereof will be omitted.

A plurality of light sources 511 may be mounted on the light source mounting board 512 to be arranged in a line immediately below the display panel 100. On the light source mounting board 512, a circuit pattern, etc. for transferring a driving voltage and signals to the light sources 511 may be formed. The light source mounting board 512 may be rested on the bottom chassis 730.

The optical members may be disposed on the traveling path of light emitted from the light sources 511 to guide the traveling path of light or to improve the optical characteristics.

The optical members may further include the reflector sheet 520 for reflecting light to prevent optical loss. The reflector sheet 520 may include a reflective surface 521 facing the display panel 100. The reflector sheet 520 may further include at least one through hole 522 into which the light sources 511 are inserted and installed. The light sources 511 may be inserted into the at least one through hole 522 to be exposed toward the display panel 100. However, the shape of the reflector sheet 520 is not limited to this example, and may change in various ways. For example, the light sources 511 may be installed on a separate board (not shown) mounted on the reflective surface 521 of the reflector sheet 520. More specifically, the light sources 511 may be installed on one surface of a board facing the display panel 100. The board may be made of a transparent material to transmit light.

The optical members may further include various optical sheets for improving optical properties. The optical sheets may be disposed above the reflector sheet 520 in the first direction Z.

The optical sheets may include the diffuser sheet 540.

The optical sheets may further include the prism sheet 550. The prism sheet 550 may focus light whose brightness has been reduced sharply when passing through the diffuser sheet 540 to improve the brightness of the light.

The optical sheets may further include the protection sheet 560 for protecting the optical sheets from external impacts or foreign materials.

The optical sheets may be formed by including a single diffuser sheet 540, a single prism sheet 550, and a single protection sheet 560, by omitting one or more of the diffuser sheet 540, the prism sheet 550, and the protection sheet 560, or by further including one or more sheets in addition to the diffuser sheet 540, the prism sheet 550, and the protection sheet 560. Also, the optical sheets may be formed using a composite sheet fabricated by combining the functions of the diffuser sheet 540, the prism sheet 550, and the protection sheet 560.

The display apparatus 1a may further include the display panel 100 for displaying images, as a display of the display apparatus 1a. The display panel 100 has been described above with reference to FIG. 2, and therefore, further descriptions thereof will be omitted.

By using the second polarizing plate and the first polarizing plate including the first polarizing layer and the at least one second polarizing layer disposed on the first polarizing layer, an effect of improving a polarization ratio may be obtained.

By using the polarizing plate containing the light absorbing agent absorbing light of a specific wavelength band to adjust the color balance between a red color, a green color, and a blue color, a desired color viewing angle may be obtained.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a display panel; and
a backlight unit configured to supply light to the display panel,
wherein the display panel comprises:
a liquid crystal layer;
a first polarizing plate disposed between the backlight unit and the liquid crystal layer; and
a second polarizing plate facing the first polarizing plate,
wherein the liquid crystal layer is disposed between the first polarizing plate and the second polarizing plate,
wherein the second polarizing plate comprises:
a polarizing layer; and
a light absorbing agent that absorbs light of a specific wavelength band, the light absorbing agent being applied on a surface of the polarizing layer, and
wherein the first polarizing plate comprises:
a first polarizing layer comprising a plurality of refracting layers having different refractive indexes arranged in a first direction; and
at least one second polarizing layer disposed on the first polarizing layer, the at least one second polarizing layer comprising a plurality of refractive materials arranged in a second direction orthogonal to the first direction wherein the light absorbing agent comprises an embossed patterned or an engraved pattern on the surface of the polarizing layer.

2. The display apparatus according to claim 1, wherein the first polarizing layer comprises:
a first surface facing the liquid crystal layer; and
a second surface facing the backlight unit, and
wherein the at least one second polarizing layer is disposed on at least one of the first surface and the second surface of the first polarizing layer.

3. The display apparatus according to claim 1, wherein the plurality of refracting layers comprises:
a plurality of first refracting layers having a first refractive index; and
a plurality of second refracting layers having a second refractive index smaller than the first refractive index, and
wherein the plurality of first refracting layers are stacked alternatingly with the plurality of second refracting layers.

4. The display apparatus according to claim 1, wherein the at least one second polarizing layer comprises polyethylene naphthalate.

5. The display apparatus according to claim 1, wherein the second polarizing plate further comprises a protection layer disposed on the polarizing layer, and comprising the light absorbing agent.

6. The display apparatus according to claim 1, wherein the light absorbing agent absorbs red light.

7. The display apparatus according to claim 1, wherein the light absorbing agent comprises tetra-aza-porphyrin.

8. The display apparatus according to claim 1, wherein the first polarizing plate further comprises an adhesive layer disposed between the first polarizing layer and the at least one second polarizing layer.

9. The display apparatus according to claim 8, wherein the adhesive layer comprises pressure sensitive adhesive.

10. A display apparatus comprising:
a display panel; and
a backlight unit configured to supply light to the display panel,
wherein the display panel comprises:
a liquid crystal layer;
a first polarizing plate disposed below the liquid crystal layer in a first direction; and
a second polarizing plate disposed above the liquid crystal layer in the first direction,
wherein the second polarizing plate comprises:
a polarizing layer; and
a light absorbing agent that absorbs light of a specific wavelength band, the light absorbing agent being applied on a surface of the polarizing layer, and
wherein the first polarizing plate comprises:
a first polarizing layer comprising a plurality of refracting layers stacked in the first direction, the plurality of refracting layers having different refractive indexes; and
at least one second polarizing layer disposed on the first polarizing layer, the at least one second polarizing layer comprising a plurality of refractive materials arranged in a second direction orthogonal to the first direction
wherein the light absorbing agent comprises an embossed patterned or an engraved pattern on the surface of the polarizing layer.

11. The display apparatus according to claim 10, wherein the first polarizing layer further comprises:
a first surface facing the liquid crystal layer; and a second surface facing the backlight unit, and wherein the at least one second polarizing layer is disposed on at least one of the first surface and the second surface of the first polarizing layer.

12. The display apparatus according to claim 10, wherein the plurality of refracting layers comprises:

a plurality of first refracting layers having a first refractive index; and a plurality of second refracting layers having a second refractive index smaller than the first refractive index, and wherein the plurality of first refracting layers are stacked alternatingly with the plurality of second refracting layers.

13. The display apparatus according to claim 10, wherein the plurality of refractive materials comprise polyethylene naphthalate.

14. The display apparatus according to claim 10, wherein the light absorbing agent comprises tetra-aza-porphyrin.

15. The display apparatus according to claim 10, wherein the second polarizing plate further comprises a protection layer disposed on the polarizing layer, wherein the polarizing layer comprises a protection layer placement surface on which the protection layer is provided, and wherein the light absorbing agent is provided on the protection layer placement surface.

16. The display apparatus according to claim 10, wherein the second polarizing plate further comprises a protection layer disposed on the polarizing layer, wherein the polarizing layer comprises a protection layer placement surface on which the protection layer is placed, and wherein the light absorbing agent is patterned on the protection layer placement surface.

17. A display panel comprising:

a liquid crystal layer;

a first polarizing plate disposed below the liquid crystal layer in a first direction, the first polarizing plate comprising a light absorbing agent that absorbs light of a specific wavelength band; and a second polarizing plate disposed above the liquid crystal layer in the first direction, wherein the second polarizing plate comprises:

a polarizing layer; and a light absorbing agent that absorbs light of a specific wavelength band, the light absorbing agent being applied on a surface of the polarizing layer, and wherein the first polarizing plate comprises:

a first polarizing layer comprising a plurality of refracting layers stacked in the first direction, the plurality of refracting layers having different refractive indexes; and at least one second polarizing layer disposed on the first polarizing layer, the at least one second polarizing layer comprising a plurality of refractive materials arranged in a second direction orthogonal to the first direction.

wherein the light absorbing agent comprises an embossed patterned or an engraved pattern on the surface of the polarizing layer.

18. The display panel according to claim 17, wherein the first polarizing layer comprises:

a first surface; and a second surface opposite to the first surface in the first direction, wherein the at least one second polarizing layer is disposed on at least one of the first surface and the second surface of the first polarizing layer.

19. The display apparatus according to claim 6, wherein the light absorbing agent transmits light of another wavelength band different from the specific wavelength band.

20. The display apparatus of claim 1, wherein the first polarizing layer further comprises a plurality of coupling layers, each coupling layer from among the plurality of coupling layers being disposed between respective adjacent refracting layers from among the plurality of refracting layers.

21. The display apparatus of claim 1, wherein the surface of the polarizing layer to which the light absorbing agent is applied faces away from the liquid crystal layer.

* * * * *